Aug. 27, 1968  H. KOELICHEN  3,399,019
CARTRIDGE SAFETY MEANS FOR REFILLABLE PEN
Filed Dec. 29, 1965  2 Sheets-Sheet 1
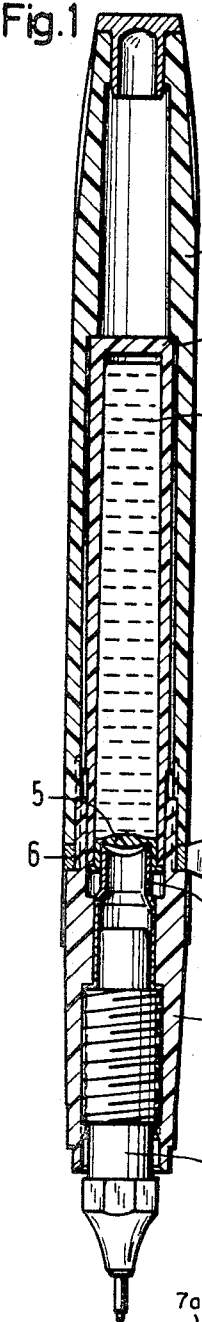
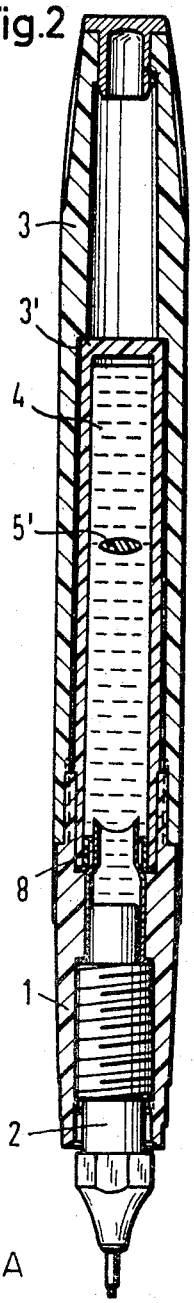
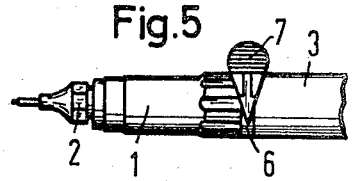
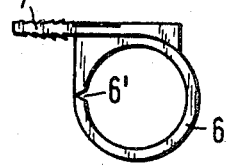
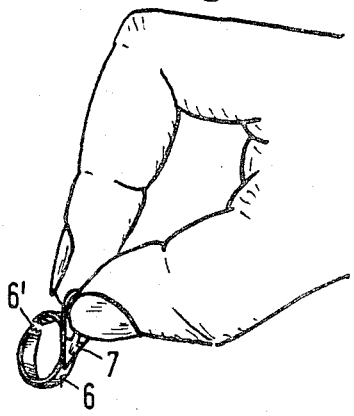
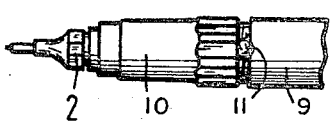
INVENTOR
HARALD KOELICHEN
By OSTROLENK, FABER, GERB & SOFFEN
ATTORNEYS Aug. 27, 1968   H. KOELICHEN   3,399,019
CARTRIDGE SAFETY MEANS FOR REFILLABLE PEN
Filed Dec. 29, 1965   2 Sheets-Sheet 2
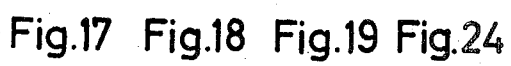
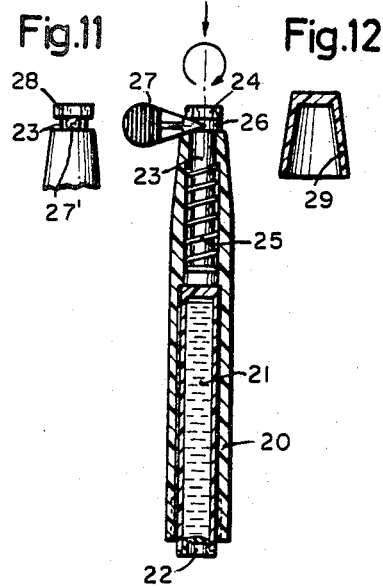
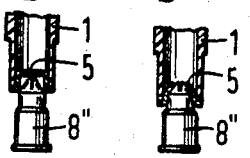
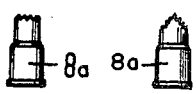
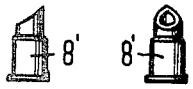
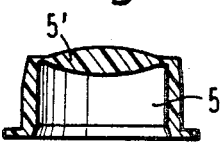
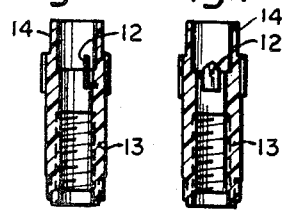
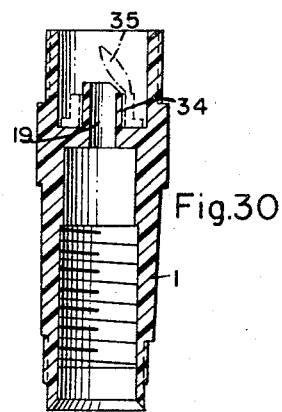
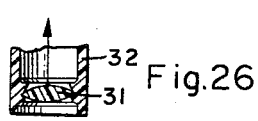
INVENTOR
HARALD KOELICHEN
BY
OSTROLENK, FABER, GERB & SOFFEN
ATTORNEYS

United States Patent Office

3,399,019
Patented Aug. 27, 1968

3,399,019
CARTRIDGE SAFETY MEANS FOR
REFILLABLE PEN
Harald Karol Andreas Koelichen, Geretsried, Bavaria,
Germany, assignor to Filler & Fiebig G.m.b.H.,
Geretsried, Bavaria, Germany
Filed Dec. 29, 1965, Ser. No. 517,326
Claims priority, application Germany, Jan. 5, 1965,
F 44,887
18 Claims. (Cl. 401—134)

ABSTRACT OF THE DISCLOSURE

A pen having a liquid ink filled replaceable cartridge inserted therein; the cartridge having a seal adapted to be punctured or broken at an end thereof; the pen comprising a body which contains the cartridge and a head which includes the writing nib and a piercing means, such as a blade, for piercing the seal to permit ink to pass to the nib; a safety means consisting of a structure, such as a ring about the pen, mounted to cause the piercing means to be held separated from the seal; the ring, in one embodiment, having a weakened portion, and a manual gripping portion, whereby when the manual gripping portion is pulled, the weakened portion breaks and the safety means may be removed from the pen; and in another embodiment, the ring comprising a ring of wax or plastic which is crushed, and broken, and falls out of the pen when the pen body is forcibly moved or screwed into the pen head.

---

The invention relates to a refillable pen comprising an insertable refill containing the writing liquid and to the construction of said refill. The invention relates more especially to refillable writing and drawing instruments which are used in connection with writing and drawing stencils and for this purpose comprise a capillary nib or point tube to which is supplied Indian ink from an insertable refill.

Refillable pens and Indian-ink writing and drawing instruments are known in which ink or Indian ink is contained in an interchangeable refill or cartridge. The refill comprises a nozzle-like opening whose seal is pierced when the refill is inserted so that the Indian-ink content is supplied to the writing or drawing nib. These instruments are usually dispatched with the refill inserted, i.e. with the refill seal pierced, so that the instrument is ready for immediate use. When the refill contents have been completely used, the refill is thrown away and replaced by a fresh one.

The invention is based on the recognition that this procedure is unsatisfactory in some respects. For example, between the time when the instrument is prepared for dispatch by the manufacturer and the time when it is first used, the writing or drawing liquid can come out of the already opened refill through the air conduits always provided in the writing or drawing pen, so that the writing or drawing nib or point may be fouled with the liquid when it comes to be used for the first time. This undesirable leakage of liquid may for example arise during transport as a result of violent jolting or shaking; it can also be caused for example by the action of heat (e.g. when left in the sun in a shop window). This defect is especially troublesome with Indian-ink pens having a capillary nib, since the ink which leaks out dries and clogs in the air conduits and on the outside of the nib, making cleaning particularly difficult. Moreover, the special construction of Indian-ink refillable pens makes them particularly more susceptible to ink leakage during transport etc. than ordinary refill pens.

It is therefore the main object of the invention to obviate this defect by providing the refillable pen, more especially the Indian-ink refillable pen, with a refill comprising a pierceable seal and also with a safety means which must be removed by the user before the instrument is used for the first time to enable the seal of the inserted refill to be pierced.

A further object of the invention is to construct a refill holding a greater quantity of liquid than the hitherto conventional refills and which may thus be termed a large-volume refill. Whereas with refillable pens having refills of ordinary ink of small volume frequent changing of the refill has necessarily been accepted, in the case of Indian-ink pens a so-called ink "tank" is usually preferred to such refills, said "tank" having a larger volume than the refills but having no seal. In contradistinction to the conventional refills, this "tank" is not thrown away when its contents have been used, but is refilled with Indian ink from a stock bottle using a filling bottle or a pipette. An object of the invention is to construct a refill which not only has a larger volume than the hitherto used refills, but which has, after its seal has been pierced, an opening which is so large that an unrestricted flow of ink is possible and that when the initial contents of the refill have been used the refill may be filled again like a "tank" container by means of a pipette or filling bottle in the conventional manner. The construction of the associated refill opener provided in the instrument is adapted to the construction of the refill and its seal according to the invention, said opener piercing or removing the seal. The construction of the refill according to the invention, of the seal thereof and of the associated refill opener may therefore be employed independently of the aforementioned safety means.

Further details and advantages of the invention will be apparent from the following description of embodiments, made with reference to the drawings, wherein:

FIGS. 1 and 2 show in longitudinal section an Indian-ink refillable pen having a capillary nib or point tube with ink refill, inserted, FIG. 1 showing the instrument with the safety means fitted by the manufacturer before dispatch and FIG. 2 showing the instrument ready for use with the safety means removed;

FIGS. 3 and 4 are a side and plan view of a ring serving as a safety means;

FIG. 5 is a view of the front part of the writing instrument with the ring safety means in place, according to FIG. 1;

FIG. 6 is a view on a larger scale of a safety ring with an intended breaking point; FIG. 6A is a view of a safety ring provided with a preformed break;

FIG. 7 is a perspective view illustrating the release of the safety ring according to FIGS. 5 and 6;

FIG. 8 is a view of the front part of a writing instrument fitted with a lacquer seal as safety means;

FIG. 9 is a view of the front part of a writing instrument in which a safety ring is fitted between the nib and the pen;

FIG. 10 is a longitudinal section through the back part of a writing instrument in which the inserted refill can be displaced by means of a special pressure pin provided with a safety ring;

FIG. 11 is a view corresponding to FIG. 10 but with a lacquer seal as safety means;

FIG. 12 shows a safety cap serving the same purpose;

FIGS. 13 and 14 are two different views of a tubular blade provided as refill opener;

FIGS. 15 and 16 show the front part of the pen with a blade serving as the refill opener;

FIGS. 17, 18 and 19 show different embodiments, in which the tubular blade is fitted on a pin of the writing unit;

FIGS. 20 and 21 show a longitudinal section of the refill opening with a seal and the refill opener provided in the pen, FIG. 20 illustrating the dispatch position and FIG. 21 the opened codition;

FIGS. 22 and 23 show further embodiments of the tubular blade;

FIG. 24 shows an embodiment in which a unilaterally ground tubular blade is fitted on a pin of the writing unit, FIG. 25 shows to a larger scale the preferred embodiment of the sealing cap of the refill;

FIG. 26 shows another embodiment of the refill seal;

FIGS. 27 and 28 are a plan view and cross-section respectively of another embodiment of the sealing cap and FIG. 29 is a cross-section of the cap of FIGS. 27 and 28 in the opened condition.

FIG. 30 is a cros-sectional view of still another embodiment of the seal construction.

FIGS. 1 and 2 show longitudinal sections through an Indian-ink refillable pen having a capillary nib known per se. The pen consists substantially of a head or front part 1, into which is screwed the writing unit 2. The latter comprises the nib and the capillary means, to which ink coming from the refill 4 is supplied through a conduit open at its rear end. Air passages (not shown) are also provided, through which small amounts of air can pass in known manner from the outside into the ink container 4 as the liquid is used. The body 3 is screwed on to the head 1.

The preferably plastic ink container 4 is filled with Indian ink by the manufacturer and sealed with a cover (sealing cap) 5 which can be pierced in the manner described hereinafter to make the instrument ready for use. According to the invention, a safety means is provided by the manufacturer which must be released or removed by the user before the air-tight cap 5 can be pierced. In the embodiment illustrated in FIG. 1, the safety means consists of a ring 6 which is interposed between the body 3 and the head 1 and which ensures that a certain distance, for example 2 mm. remains between the body and the head and that accordingly the sealing cap 5 cannot at first be pierced by the blade 8 provided in the head. This piercing can only take place if the safety ring 6 is removed, enabling the body 3, as shown in FIG. 2, to be screwed completely to the head 1 so that the lower end face of the body 3 comes to bear against an upper shoulder of the head 1. As this is done, the ink container 4, the back end of which bears against an inside shoulder 3' of the body 3, is displaced downwardly in the axial direction and the blade 8 pierces the seal 5. The central portion 5' of the seal 5 is detached in the manner described in detail hereinafter and passes freely into the inside of the ink-filled container 4, where it floats on the surface. Ink can then flow unrestricted from the container 4 through the tubular blade 8 to the writing unit 2, in contradistinction to the known refills having a nozzle-shaped opening, in which the ink flow is hindered by capillary forces. As illustrated in FIGS. 3 and 4, the safety ring 6 may consist of a simple ring of suitable material; to remove this safety ring, the body 3 together with the inserted refill 4 must then first be unscrewed from the head 1. After removing the safety ring, the body 3 containing the refill 4 is then again screwed onto the head 1 and the refill seal is opened as shown in FIG. 2, the instrument then being ready for use.

However, according to a preferred embodiment the safety ring may be constructed so that it can be removed without unscrewing the body 3 from the head 1. For this purpose, the safety ring 6 is provided with a finger grip 7, as shown in FIGS. 1 and 5, which can be gripped between thumb and finger to remove the ring. To facilitate removal, the ring 6 may be weakened at a certain point 6' (intended breaking point), as shown in FIGS. 6 and 7, so that it breaks at this point when the finger grip 7 is pulled with relatively little effort and may easily be removed. As illustrated in FIG. 6A, it would also be possible to provide a complete break 6a' in the ring 6a in this case consisting preferably of a suitable plastic, the ring holding its shape by its natural resiliency; this ring can then be widened against the force of its natural resiliency by pulling the finger grip 7a and can be removed laterally.

Although in the preferred embodiment described above the safety distance between the body 3 and the head 1 is obtained by an interposed ring, other means may be used for the same purpose. FIG. 8 shows an embodiment in which the manufacturer obtains the safety distance between the body 9 and the head 10 by interposing a lacquer seal 11 in the intermediate space. To remove this seal 11, it is merely necessary to screw up the body 9 onto the head 10, which is done with little effort, and the seal 11 is compressed and falls out. The body 9 can then by screwed on until the position like that shown in FIG. 2 is reached.

In the embodiment shown in FIG. 1, the blade 8 is constructed as a metal tube whose end portion is of reduced diameter, this tube being ground concavely at the end to form the cutting edge. The blade 8 is preferably stuck or moulded into the head 1 when the latter is made. The concave grinding may be carried out symmetrically as in FIG. 1 or unilaterally in the blade 8' shown in FIGS. 13 and 14.

FIGS. 15 and 16 show another example of embodiment in which a small blade 12 is moulded into the head 13, this blade breaking the refill seal when the body 14 and the head 1 are screwed together.

The blade may however also be arranged on a writing unit 15, as shown for example in FIGS. 17, 18 and 19, and in FIG. 24. In the embodiments shown here, the tubular blade is fitted on the pin at the back end of the writing unit 15 and, for example, adhesively secured. In this case, it is possible to provide the safety spacing between a shoulder of the unit 15 and the free end face of the head 16, and not between the head and the body as in the examples described above. FIG. 9 shows such an embodiment in which the safety ring 17 is interposed between a shoulder of the unit 18 and the free end face of the head 19. After removal of the ring 17 in the manner described, in this case the unit 18 must be screwed completely into the head 19 so that the cutting edge of the blade arranged on said unit 18 removes the refill seal. A lacquer seal as described with reference to FIG. 8 may be used instead of the safety ring 17 shown in FIG. 9.

A pressure pin as shown in FIG. 10 may be used to displace the filled and sealed refill against the blade and thus open the refill seal. This figure shows the body 20, which is screwed in the usual manner, as shown in FIG. 2, to the head (not shown in FIG. 10).

The filled refill 21, sealed at 22, is disposed in the body 20 in the position shown in FIG. 1. Arranged above the refill 21 in the body 20 is a pressure pin 23 which terminates in the end 24 outside the body and on which acts the pressure spring 25 tending to push the pin 23 and thus the refill 21 downwards. However, the pressure spring 25 is initially held back by a safety ring 26 interposed between the end 24 and the upper end face of the body 20. The pressure pin 23 is not freed until the safety ring 26, 27 has been removed in the manner described above. FIG. 11 illustrates a modification of this embodiment having instead of the ring 26 a lacquer seal 27' which may be removed for example by pressing the head 28. The displaceable pressure pin according to FIGS. 10 and 11 could be replaced by a threaded pin which is displaced axially by rotating it by its outer end, the equivalent of end 24. In this case, the pressure spring 25 is not necessary. When such a rotatable pressure pin is used, it is not essential to interpose a safety ring: a safety cap 29 covering the outer end of the rotatable pin and fitted on the pen body will suffice, said cap 29 being removed to make the outer end accessible.

FIGS. 13 and 14 are two different views of a tubular blade ground concavely on one side, which may be used in the embodiment according to FIGS. 1 and 2. FIGS. 20 and 21 show a modification 8" of the tubular blade in which the cutting edge is formed by a plurality of tongues bent inwardly to form a conical point which pierces the seal in the manner illustrated in FIG. 21. FIGS. 22 and 23 show further modifications 8a of the tubular blade, the latter having in these cases a serrate cutting edge.

FIG. 25 shows the refill seal 5 of FIG. 1 to a larger scale. This cup-shaped seal may preferably be adhesively secured or welded in the opening of the refill 4. The lenticular base 5' of the seal is joined to the wall of the cup by a relatively thin annular zone which is cut by the blade so that the base 5' is separated as shown in FIG. 2 and an opening of large cross-section is formed.

FIG. 26 shows another possible embodiment in which a lenticular plate 31 is inserted in a groove provided in the inside wall of the refill 32 and possibly secured by welding or adhesive, said plate 31 being separated and pushed inwardly by the blade.

Finally, FIGS. 27 and 28 show two different views of a cup-shaped sealing cap 33, the base of which is weakened by means of crossed grooves in such a manner that said base is separated under the pressure of the blade, as shown in FIG. 29.

The user himself may if necessary fit the safety means again when a new refill is inserted, for example if the instrument is to be taken on a journey or not used for a relatively long time.

The pressure pin described, which is accessible from outside and displaceable by sliding or screwing and which presses the refill against the blade, may also be used independently of the safety means described, more especially when a new refill is subsequently inserted.

As shown more especially by FIGS. 1 and 2, the front part of the refill 4 is a tight fit in the threaded extension of the head 1, whereas said refill 4 is accommodated in the body 3 with a certain play. As shown in FIG. 1, the edge of the blade may bear lightly against the seal 5 or it may be spaced therefrom by a few tenths of a millimeter.

In the examples of embodiment described above, the refill opening means consists of a metal cutting device in the form of a suitably sharpened tube, which is fitted into the plastic head.

According to another preferred embodiment which is illustrated in FIG. 30, a plastic piercing member serving the same purpose as the metal cutting member described above is moulded integrally with the head when the latter is made.

The plastic cutting member 34 differs from that of metal in that when the refill seal 35 is opened, the seal is not cut away completely, the piercing member being so shaped that it acts on less than the whole periphery of the seal and said seal is then tilted by the plastic piercing member in the manner of a hinge (shown on dot-dash line in FIG. 30).

Since in this embodiment the greater wall thickness results in a smaller ink flow, the ink passage is provided with longitudinal grooves to break the ink meniscus and to promote the ink flow by capillary action.

What I claim is:

1. In a refillable writing and drawing instrument for use with liquid ink, said instrument comprising:

a tubular body; one end of said body having a head removably mounted thereto; a writing insert fitted into said head;
a refill cartridge replaceably inserted into said body; said cartridge having a seal; a seal piercing means mounted to said head and facing said seal;
a safety means positioned in said instrument to separate said piercing means from said seal;
the improvement comprising:
said safety means being constructed to be removable from said instrument without separation of said body and said head; said safety means comprising a ring positioned on the instrument and providing a space between said piercing means and said seal; said ring being provided with a gripping portion for facilitating removal of said ring;
said ring having a weakened portion adapted to break, whereby said ring may be removed.

2. Refillable writing instrument, as claimed in claim 1, wherein a pressure pin is arranged in the body above the refill, said pin terminating outside the body and being axially displaceable therein so as to press the refill against the piercing means and thus to open the seal.

3. Instrument as claimed in claim 2, wherein said pressure pin is displaceable by sliding in the body and is acted upon by a pressure spring.

4. Instrument as claimed in claim 3, wherein said pressure spring tends to press said pressure pin outwardly, so that said pressure pin must be displaced in the axial direction inwardly by hand in order to open the refill.

5. Instrument as claimed in claim 3, wherein said pressure spring tends to displace said pin inwardly in the axial direction and is initially prevented from doing so by said safety means.

6. Instrument as claimed in claim 1, wherein said piercing means consists of a tubular blade with a cutting edge.

7. Instrument as claimed in claim 6, wherein the tubular blade is ground symmetrically and concavely to form the cutting edge.

8. Instrument as claimed in claim 6, wherein the tubular blade is ground unilaterally.

9. Instrument as claimed in claim 6, wherein the diameter of the tubular blade is reduced along the portion of said blade which is displaced into the refill.

10. Instrument as claimed in claim 9, wherein said blade is fitted in the head.

11. Instrument as claimed in claim 6, wherein said tubular blade is fitted on a pin of the writing insert.

12. Instrument as claimed in claim 1, wherein said piercing means comprise a plastic tubular member integrally moulded with said head.

13. Instrument as claimed in claim 12, wherein said piercing means is so shaped that it acts on less than the whole periphery of the seal so that said seal is pivoted.

14. Instrument as claimed in claim 12, wherein the ink passage is provided with longitudinal grooves.

15. Interchangeable refill for liquid ink writing and drawing instruments as claimed in claim 1, comprising a sealing cap of which said seal is a part; said seal which being opened, when the refill is inserted, by piercing means arranged fixedly in the instrument, wherein the seal is removed approximately along its entire central portion, corresponding to the internal diameter of said refill.

16. Refill as claimed in claim 15, wherein said sealing cap is cup-shaped.

17. Refill as claimed in claim 15, wherein said sealing cap has a substantially lenticular base; said base is joined to the wall of said sealing cap by a relatively thin annular zone which is cut by said piercing means.

18. Refill as claimed in claim 17, wherein the base of the cup-shaped sealing cap is weakened by crossed or radial grooves or recesses in such a manner that the base separates into tongues under the pressure of the piercing means.

(References on following page)

References Cited

UNITED STATES PATENTS

| | | | |
|---|---|---|---|
| 2,771,218 | 11/1956 | Henderson | 222—83 |
| 2,829,801 | 4/1958 | Ayres | 222—83 XR |
| 3,087,463 | 4/1963 | Kahn et al. | 401—135 |
| 2,623,227 | 12/1952 | Moonert | 15—539 X |

FOREIGN PATENTS

| | | |
|---|---|---|
| 30,128 | 12/1910 | Great Britain. |
| 929,331 | 6/1963 | Great Britain. |
| 954,301 | 4/1964 | Great Britain. |

CHARLES A. WILLMUTH, *Primary Examiner.*

R. W. MICHELL, *Assistant Examiner.*